2 Sheets—Sheet 1.

W. H. DOANE,

Assignor to J. A. FAY & Co.

Planing Machine.

No. 9,574. Reissued Feb. 15, 1881.

Witnesses:
Chas. S. Hyer
D. P. Corl

Inventor:
William H. Doane
assignor to
J. A. Fay & Co.
by their attorneys
Dibdin & Wilkie

N. PETERS, PHOTO-LITHOGRAPHER, WASHINGTON, D. C.

W. H. DOANE,

Assignor to J. A. FAY & Co.

Planing Machine.

No. 9,574. Reissued Feb. 15, 1881.

WITNESSES:

Charles S. Fryer.

D. R. Cole

INVENTOR:

William H. Doane assignor to

J. A. Fay & Co.

by their attorneys

Eddy & Brosseau

N. PETERS, PHOTO-LITHOGRAPHER, WASHINGTON, D. C.

UNITED STATES PATENT OFFICE.

WILLIAM H. DOANE, OF CINCINNATI, OHIO, ASSIGNOR TO J. A. FAY & CO., OF SAME PLACE.

PLANING-MACHINE.

SPECIFICATION forming part of Reissued Letters Patent No. 9,574, dated February 15, 1881.

Original No. 155,431, dated September 29, 1874. Application for reissue filed January 24, 1881.

*To all whom it may concern:*

Be it known that I, WILLIAM H. DOANE, of Cincinnati, in the county of Hamilton and State of Ohio, have invented certain new and useful Improvements in Planing-Machines; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to machines designed to plane the edges of flooring-boards, and cut therein the tongue and groove peculiar to flooring-boards; and my invention consists, first, in the provision and combination of three cutter-heads, between the central and outer ones of which two flooring-boards may be run and cut at one and the same time; secondly, in a peculiar construction and arrangement of the gear-wheels, by which the expansible rolls are driven, that permit wheels of larger diameter than the diameter of the feed-rolls to be used; thirdly, in such a construction of the upper feed-rolls and their elevating devices that the central journals of these upper feed-rolls are independent and adapted for separate vertical movement, so that two boards of unequal thickness can be fed properly.

Figure 1:
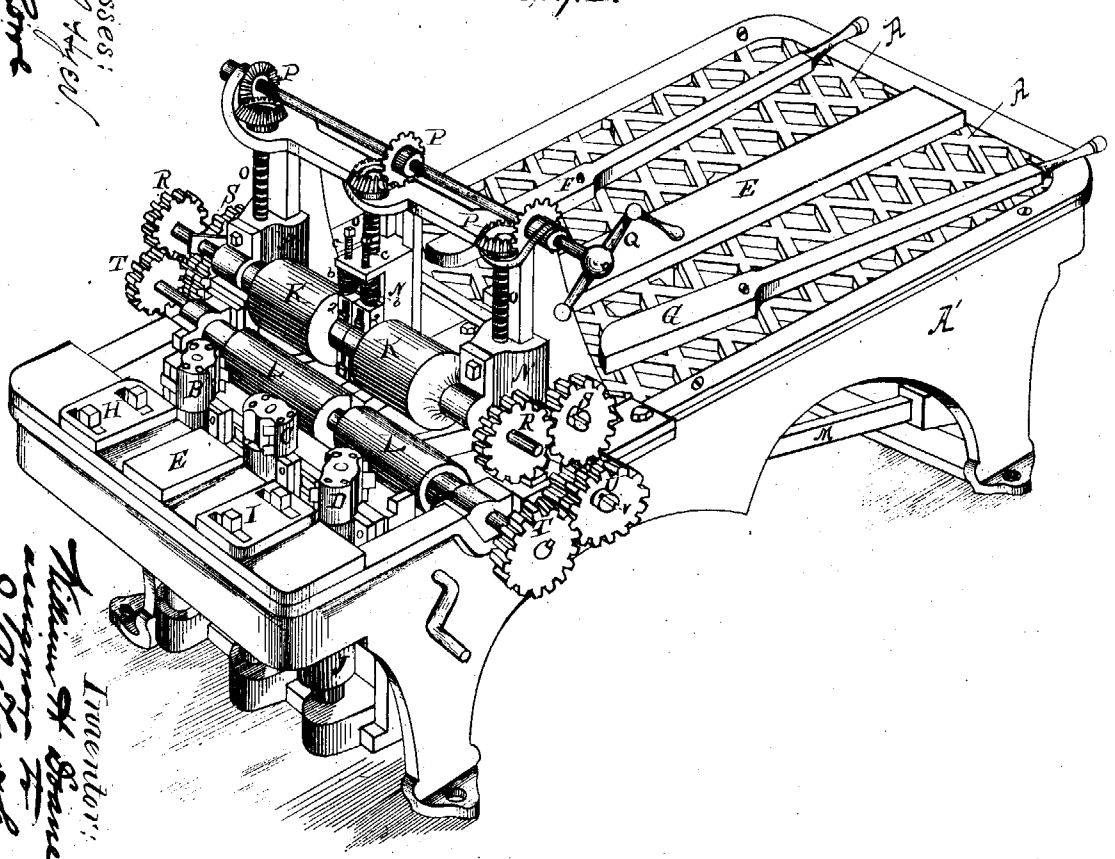
Figure 2:
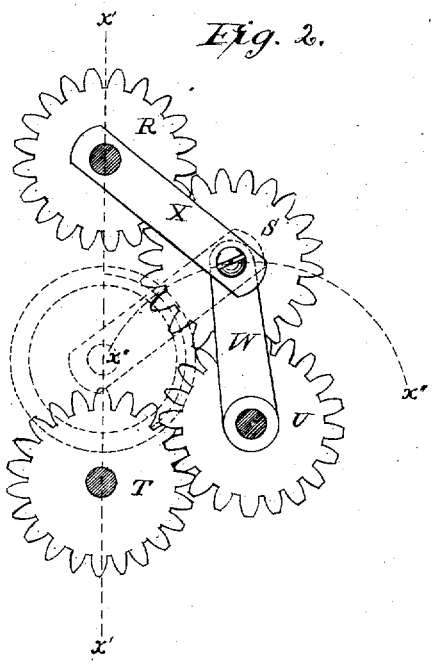
Figure 3:
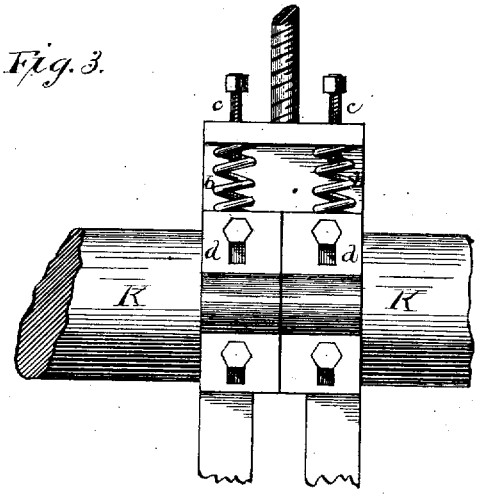

Figure 1 is a perspective view of a machine embodying my invention. Fig. 2 is an elevation of the expansible roll gear-wheels. Fig. 3 is an elevation of the journal device for the inner ends of the upper feed-rollers.

A frame of ordinary construction (marked A′ in the drawings) is provided, in suitable journal-boxes of which three cutter-spindles are journaled vertically, the cutter-heads B C D of which are provided with cutters for tonguing and grooving, as shown in Fig. 1. Between the cutter-heads B C and C D two boards are designed to be fed and cut at one and the same time, the boards being supported on the fixed bed or lumber-supporting surface A, and properly guided between the central strips, E, and adjustable gages F G, which swing, and H I, which slide. The cutter-spindles are driven by belting from the driving-shaft, in the usual way, over pulleys J. The lower feed-rollers, L, are both upon one shaft, and the upper feed-rollers are upon separate shafts, the journals of the separate shafts meeting in the center of the machine. Between the rollers K and the lower feed-rollers, L, the two separate boards are fed to the cutters, the friction of the rollers and revolution of the same serving to force the boards between the cutters. As is customary, the upper rollers are attached by suitable means to weighted levers M, which serve to press these rollers down tightly upon the boards. The rollers K are journaled in sliding boxes N, which are raised and lowered by screws O, beveled gearing P, and hand-crank Q, the screws being fitted to the gearing by feathering-connections, customary, to permit the weighted levers to move the slides N, independent of the gearing, to limited extent. Three single wheels and one double wheel are used at each end of the feed-rollers to drive the same, so as to permit expansion or contraction of the distance between the feed-rollers. The single wheels are marked R S T, and the double wheel U. The wheels R T are upon the shafts of the feed-rollers, and a double wheel, U, upon a stud, V, secured to the frame of the machine. The double wheel revolves loosely upon the stud, and upon this same stud a link, W, is attached, which carries a stud for the wheel S, the wheel S being linked to the wheel R by link X. In the expansion of the rolls the wheel R moves in a vertical path, as shown in dotted lines X′ X′, and the wheel S in a curved path. (Shown in dotted lines X″ X″ in Fig. 2.)

It will be seen, in reference to Fig. 1, that the wheel S connects to the inside part of the double wheel U, while the wheel T connects to the outer side. This arrangement, however, can be reversed, and its purpose is to permit the periphery of wheel R to pass below the periphery of wheel T, so that while the feed-rollers can be run close together the wheels R T can be of larger diameter than the diameter of the feed-rollers, and consequently of greater power than gear-wheels which are all in line, and necessarily smaller in diameter than the feed-rollers.

The inner ends of feed-rollers K are separately journaled to boxes *a*, which are slotted vertically and secured to a single slide, N, the slots permitting the independent vertical movement of each box *a*, and consequently permitting the rollers K to feed at the same time different thicknesses of boards.

The boxes *a* are kept to their work by powerful springs *b*, which are held in place by set-screws or pins C.

I am aware that it is not new to drive the feed-rolls of a molding-machine by a train of gearing so combined that the driving-wheels on the respective feed-rolls may be larger than the diameter of either of the latter by passing each other. My improvement of this feature is limited to the peculiar devices employed.

I do not herein claim anything contained in United States Patent No. 111,632, granted to James Goodrich and Henry J. Colburn, jointly, February 7, 1871.

I claim—

1. The combination of the three cutter-heads B C D, in a flooring-machine, the middle cutter-head cutting on both sides, substantially in the manner and for the purpose specified.

2. The combination of feed-rollers K L, sliding journal-boxes N, gear-wheels R T, linked gear-wheels S X W, and double-faced gear-wheel U, arranged and operating substantially in the manner and for the purpose specified.

3. The combination of feed-rollers K, slide N, separately-adjustable boxes *a*, and springs *b*, operating substantially in the manner and for the purpose specified.

4. The combination, substantially as before set forth, of two independent gravitating power-driven feed-rolls, extending, respectively, part way across the lumber-supporting surface from opposite sides of the machine.

5. The combination, substantially as before set forth, of two independent gravitating power-driven feed-rolls, extending, respectively, part way across the lumber-supporting surface from opposite sides of the machine and having overhead center supports.

6. The combination, substantially as before set forth, of two independent gravitating power-driven feed-rollers, extending, respectively, part way across the lumber-supporting surface from opposite sides of the machine, and the counter-rollers, whereby two boards of equal or unequal thickness may be worked through the machine simultaneously.

In testimony whereof I affix my signature in presence of two witnesses.

W. H. DOANE.

Witnesses:
C. A. NEALE,
F. L. OURAND.